(12) United States Patent
Chung et al.

(10) Patent No.: US 9,372,562 B2
(45) Date of Patent: Jun. 21, 2016

(54) MOBILE TERMINAL AND METHOD OF CONTROLLING THE MOBILE TERMINAL

(71) Applicant: LG ELECTRONICS INC., Seoul (KR)

(72) Inventors: Minjoo Chung, Seoul (KR); Hosoo Kim, Seoul (KR); Jeehee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 14/187,025

(22) Filed: Feb. 21, 2014

(65) Prior Publication Data
US 2015/0009157 A1 Jan. 8, 2015

(30) Foreign Application Priority Data
Jul. 8, 2013 (KR) ........................ 10-2013-0079878

(51) Int. Cl.
*G06F 3/041* (2006.01)
*G06F 17/24* (2006.01)
*G06F 9/54* (2006.01)
*G06F 3/0482* (2013.01)
*G06F 3/0488* (2013.01)
*G06F 3/0484* (2013.01)

(52) U.S. Cl.
CPC .............. *G06F 3/041* (2013.01); *G06F 3/0482* (2013.01); *G06F 3/04842* (2013.01); *G06F 3/04883* (2013.01); *G06F 9/543* (2013.01); *G06F 17/24* (2013.01)

(58) Field of Classification Search
CPC ............... G06F 3/041–3/047; G06F 17/24; G06F 3/04842; G06F 3/0482; G06F 3/04883; G06F 9/543

USPC .................... 178/18.01–19.07; 345/173–178; 715/700–866
See application file for complete search history.

(56) References Cited

U.S. PATENT DOCUMENTS

2010/0122194 A1* 5/2010 Rogers ................ G06F 3/04817
715/769
2012/0246573 A1 9/2012 Arokiaswamy

FOREIGN PATENT DOCUMENTS

EP 2535811 A1 12/2012

OTHER PUBLICATIONS

Anonymous, "Cut, Copy and Paste", URL: https://web.archive.org/web/20130609153704/http://www.istudiopublisher.com/help-pages/pgs/cut-copy-and-paste.html, XP055152077, Jun. 9, 2013, pp. 1-4.

(Continued)

*Primary Examiner* — Michael Pervan
(74) *Attorney, Agent, or Firm* — Birch, Stewart, Kolasch & Birch, LLP

(57) ABSTRACT

A mobile terminal including a touch screen display unit configured to display content; and a controller configured to receive a setting of a region included in the displayed content, display a first graphic object corresponding to a first type of data included in the content in the set region and display a second graphic object corresponding to a second type of data included in the content in the set region, receive a selection of the first graphic object, extract the first type of data included in the content, and display the first type of data extracted from the content without the second type of data.

10 Claims, 18 Drawing Sheets

(56) References Cited

OTHER PUBLICATIONS

Anonymous, "FingerWorks—Gesture Guide—Mouse Emulation", URL: http://web.archive.org/web/20021210155752/http://www.fingerworks.com/gesture_guide_mouse.html, XP002404586, Dec. 10, 2002, 1 page.

Anonymous, "Two ContextMenus at the same time for multi touch", URL: http//www.techques.com/question/1-5562546/Two-ContextMenus-at-the-same-time-for-multi-touch, XP055154681, Apr. 6, 2011, pp. 1-4.

* cited by examiner

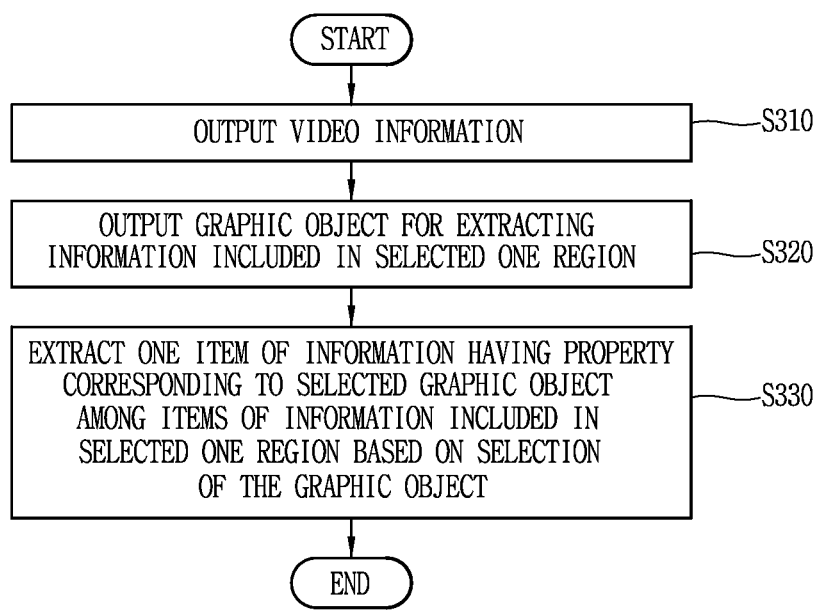

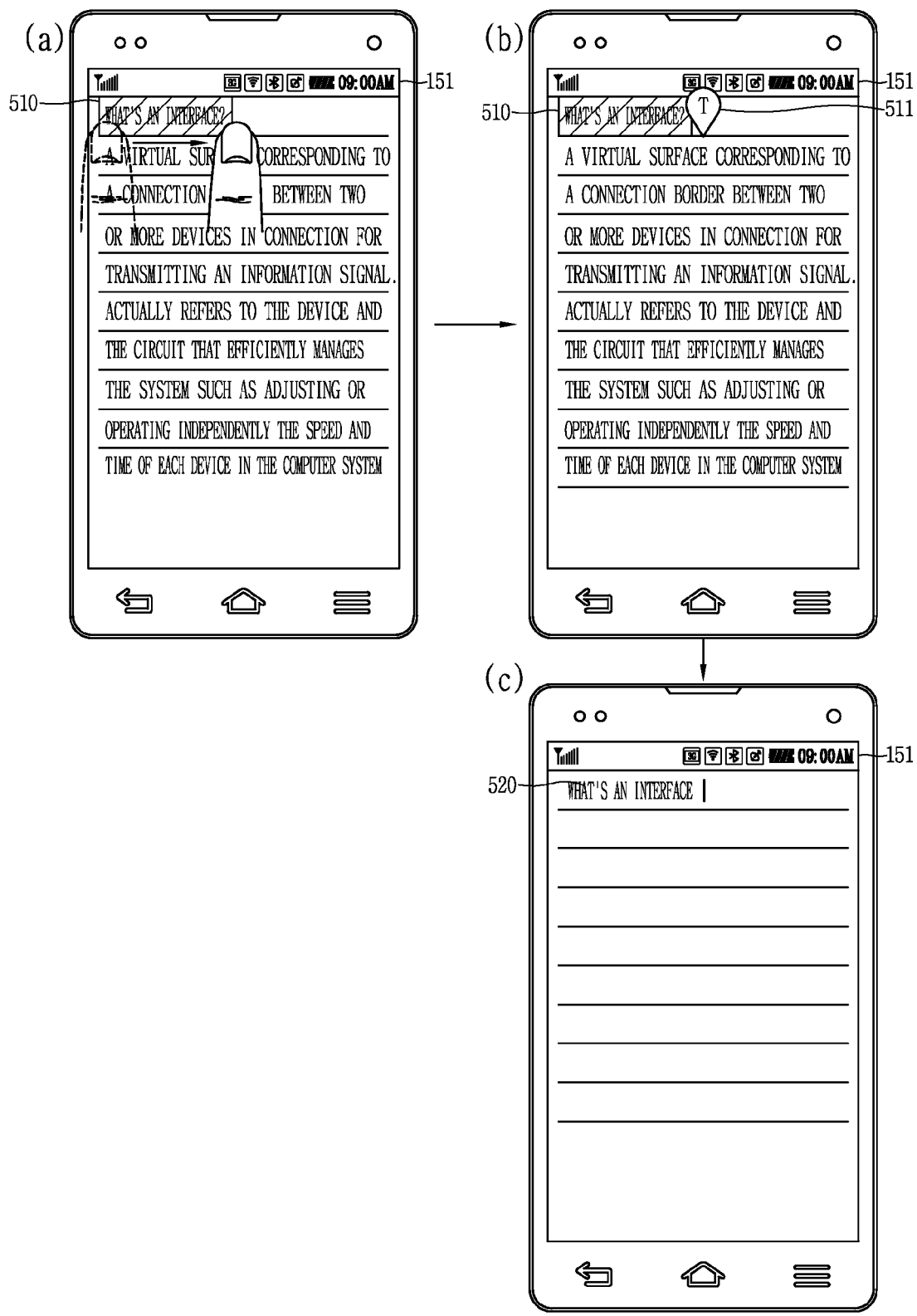

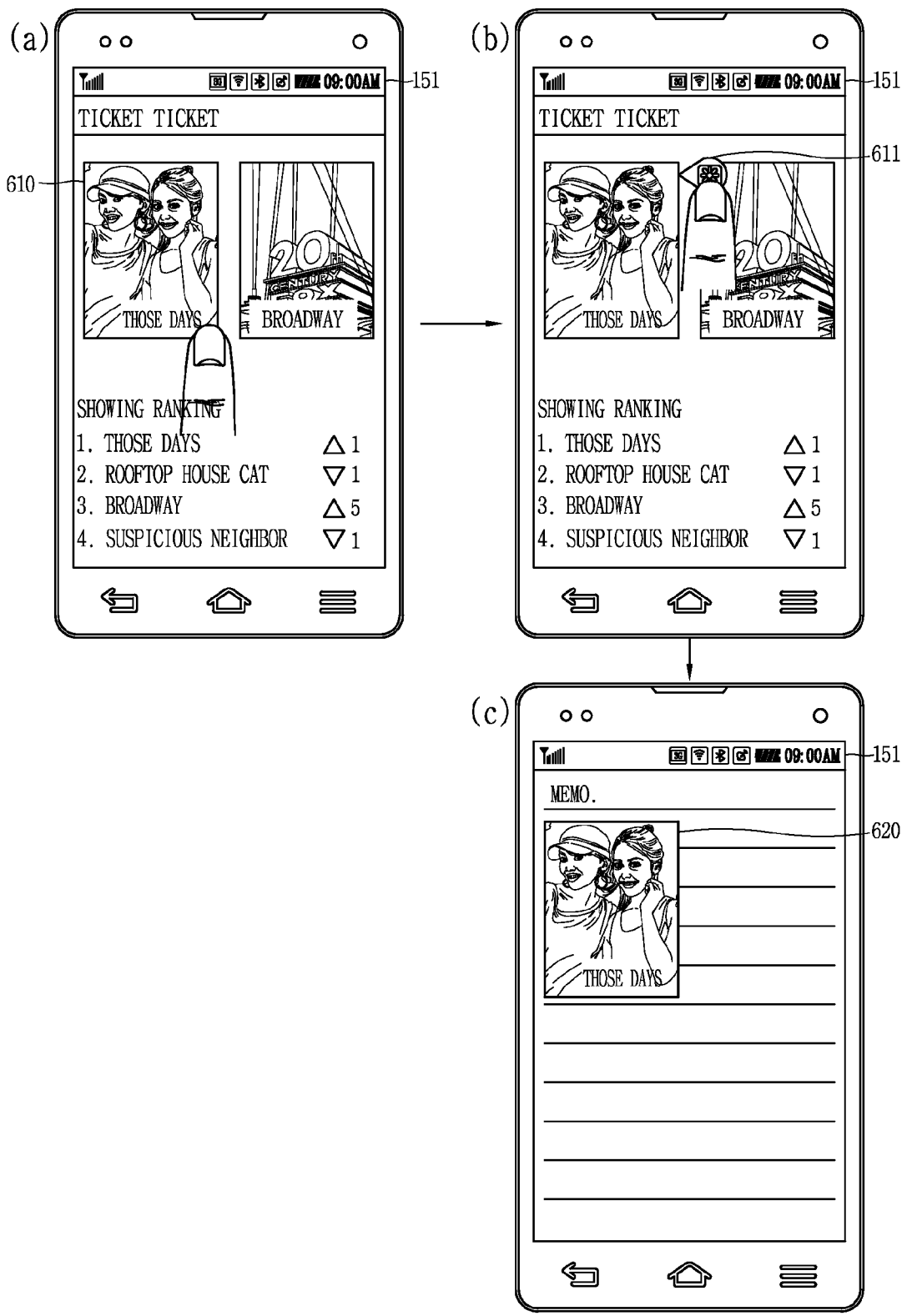

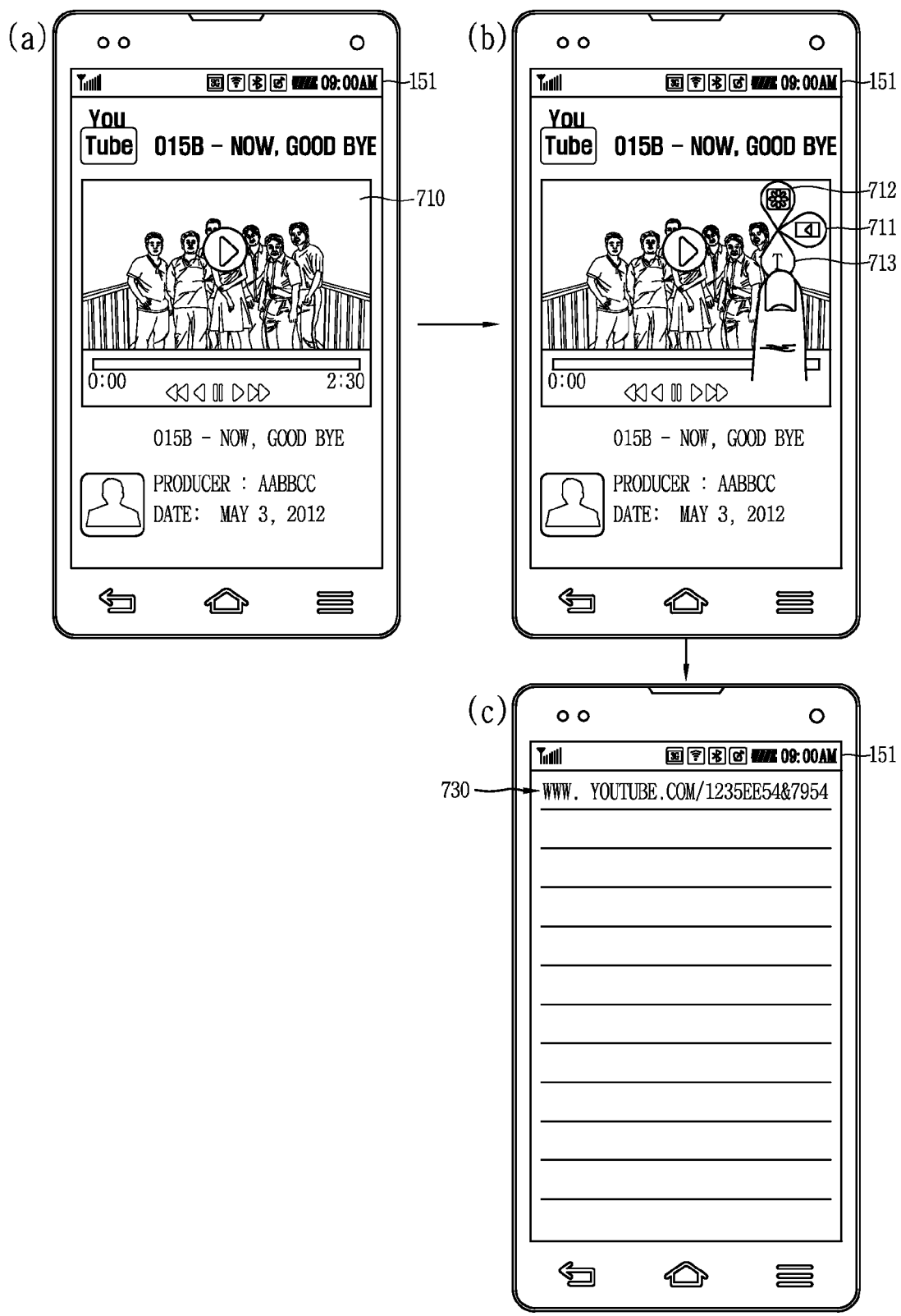

MOBILE TERMINAL AND METHOD OF CONTROLLING THE MOBILE TERMINAL

CROSS-REFERENCE TO A RELATED APPLICATION

Pursuant to 35 U.S.C. §119(a), this application claims the benefit of earlier filing date and right of priority to Korean Application No. 10-2013-0079878, filed on Jul. 8, 2013, the contents of which is incorporated by reference herein in its entirety.

BACKGROUND OF THE INVENTION

1. Field of the Invention

The present invention relates to a mobile terminal for selecting at least one item of information from among items of information included in a display unit and a method of controlling the mobile terminal.

2. Background of the Invention

A terminal is broadly categorized by mobility into a mobile terminal and a stationary terminal. The mobile terminal is further categorized by portability into a handheld terminal and a vehicle-mounted terminal.

In addition, the mobile terminal outputs various types of information, for example, text, an image, and a moving image. At least one item of information that is output in this manner is selected by a user request and is utilized in various ways in the mobile terminal.

SUMMARY OF THE INVENTION

Therefore, an aspect of the detailed description is to provide a mobile terminal for selecting at least one item of information from among items of information displayed on a display unit, considering a property of the information that is output on the display unit, and a method of controlling the mobile terminal.

To achieve these and other advantages and in accordance with the purpose of this specification, as embodied and broadly described herein, there is provided a mobile terminal including a display unit on which video information is output, and a controller that when at least one region of the display unit is selected, extracts information associated with content that is output on the one region, in which in response to the selection of the one region the controller outputs at least one input window for input the extracted information into at least one part of the display unit, and the number of input windows varies depending on a property of the extracted information.

In the mobile terminal, if in association with the content, the two items of information, different in property, are extracted, the controller may output at least the two input windows.

In the mobile terminal, the controller may output a graphic object corresponding to the property of the information that can be input into the input window.

In the mobile terminal, the graphic object may be output adjacent to any one of the input window and the content or may be output on both of the input window and the content.

In the mobile terminal, when the graphic object is selected, the controller may output at least one item of information associated with the property corresponding to the graphic object among the items of extracted information, on the input window corresponding to the graphic object.

To achieve these and other advantages and in accordance with the purpose of this specification, as embodied and broadly described herein, there is provided a mobile terminal including a display unit on which video information is output, a user input unit that is formed for selecting one region of the display unit, and a controller that extracts information corresponding to content that is output on the selected one region, in which in response to the selection of the selected one region, the controller outputs a graphic object for extracting information corresponding to the content and corresponding to the selection of the graphic object, extracts the information, and the graphic object has video information that differs depending on a property of the information corresponding to the content.

In the mobile terminal, if the information corresponding to the content can be extracted as having at least the two properties, the controller may output the graphic objects that correspond to the at least two properties, respectively.

In the mobile terminal, the controller may extract the information corresponding to the content, as having the property corresponding to the graphic object selected by a user among the graphic objects that correspond to the at least two properties, respectively.

In the mobile terminal, the property of the information corresponding to the content may be in association with at least one of text, an image and a moving image.

To achieve these and other advantages and in accordance with the purpose of this specification, as embodied and broadly described herein, there is provided a mobile terminal including a display unit on which video information is output, a controller that in response to selection of at least one region of the display unit, outputs a graphic object for extracting information included in the selected one region, in which if the items of information included in the one region can be extracted as items of information corresponding to properties that are different from each other, the controller outputs the graphic objects that correspond to the properties that are different from each other, respectively.

In the mobile terminal, the controller may extract the information included in the one region, based on the selection of at least one of the graphic objects that correspond to the properties that are different from each other, respectively, and the extracted information may have the property corresponding to the selected graphic object.

In the mobile terminal, when the one region is selected, the controller may analyze the property of the information included in the one region.

In the mobile terminal, the one region may be set through a predetermined-type touch input with respect to the display unit, and the predetermined-type touch input may include a drag touch input.

In the mobile terminal, a size of the one region may correspond to the extent to which the drag touch input is applied, and when the one region is set through the drag touch input, the controller may output the graphic object corresponding to the property of the information included in the one region that is set.

In the mobile terminal, if the one region that is set is changed corresponding to the drag input and a successive touch input, a first region corresponding to the one region that is set is changed to a second region that is different from the first region, based on the successive touch input, and the information having the property different from the property of the information included in the first region is additionally in the second region, the graphic object corresponding to the different property may be additionally output on the display unit, together with the graphic object corresponding to the property of the information included in the first region.

In the mobile terminal, when the graphic object corresponding to the property of the information included in the first region is selected, the information included in the first region may be extracted, and when the graphic object corresponding to the different property is selected, the information included in the second region may be extracted.

To achieve these and other advantages and in accordance with the purpose of this specification, as embodied and broadly described herein, there is provided a method of controlling a mobile terminal, including outputting video information, outputting a graphic object for extracting information included in one selected region in response to the selection of at least one region of a display unit, and extracting the information included in the one region, based on the selection of the graphic object that is output, in which in the outputting of the video information, if the items of information included in the one region can be extracted as items of information corresponding to properties that are different from each other, the graphic objects that correspond to the properties that are different from each other, respectively, are output, and the extracted information has the property corresponding to the selected graphic object.

The method may further include outputting the extracted information corresponding to the extracted information back on the display unit, based on a user request.

In the method, the extraction information may be output on a region that is set in advance by the user request.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flowchart illustrating a method in which information is extracted in the mobile terminal according to one embodiment of the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' are used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
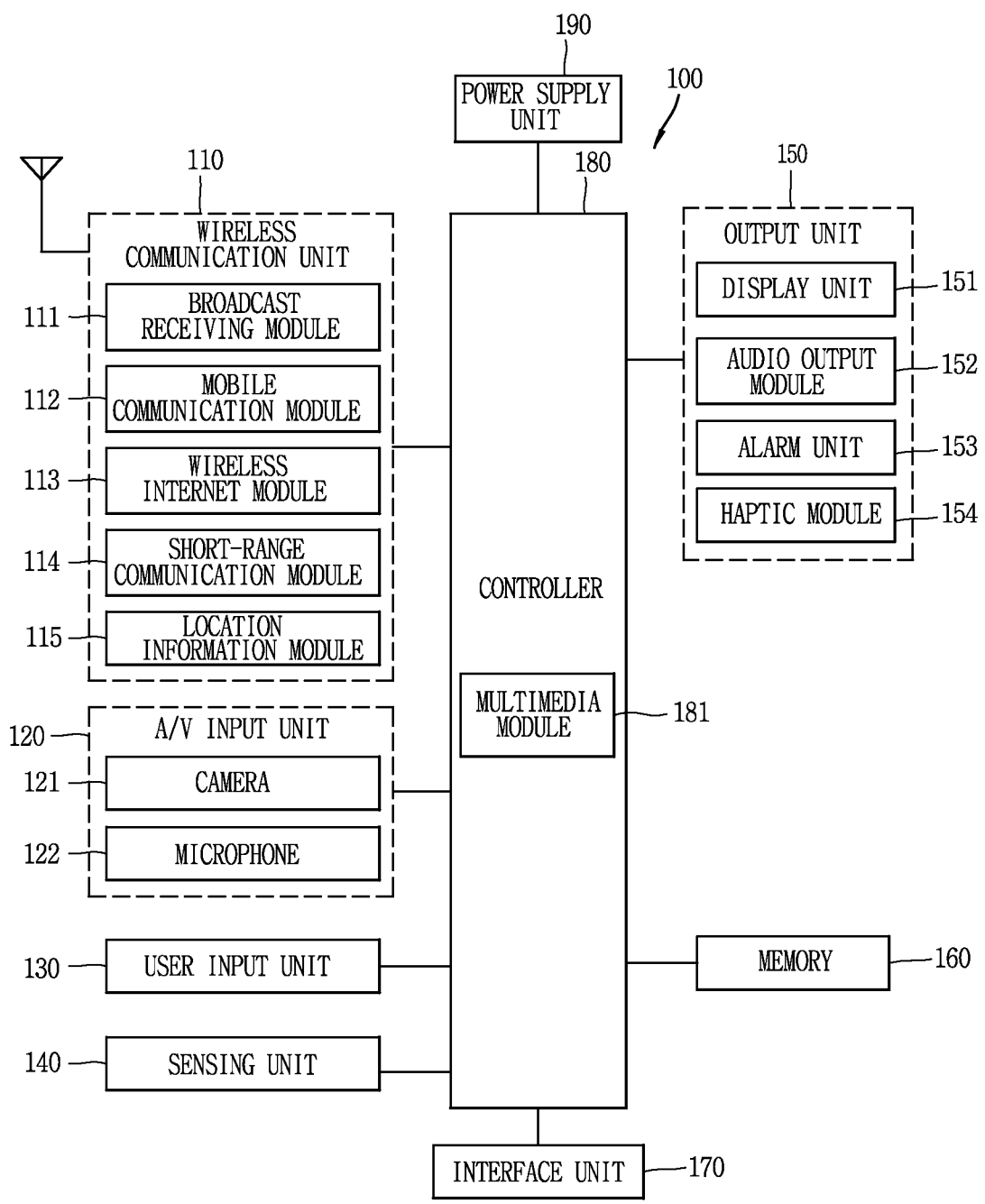
FIG. 1 is a block diagram illustrating a mobile terminal according to one embodiment of the present invention.

FIG. 1 is a block diagram of a mobile terminal according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), Zig-Bee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 for the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100.

For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure. Here, the touch object is an object to apply touch to the touch sensor, which may be a finger, a touch pen, a stylus pen, a pointer, etc.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controller 180 can execute a locked state for limiting a user's input of control commands with respect to applications. And, the controller 180 can control a locked screen displayed in the locked state, based on a touch input sensed by the display 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
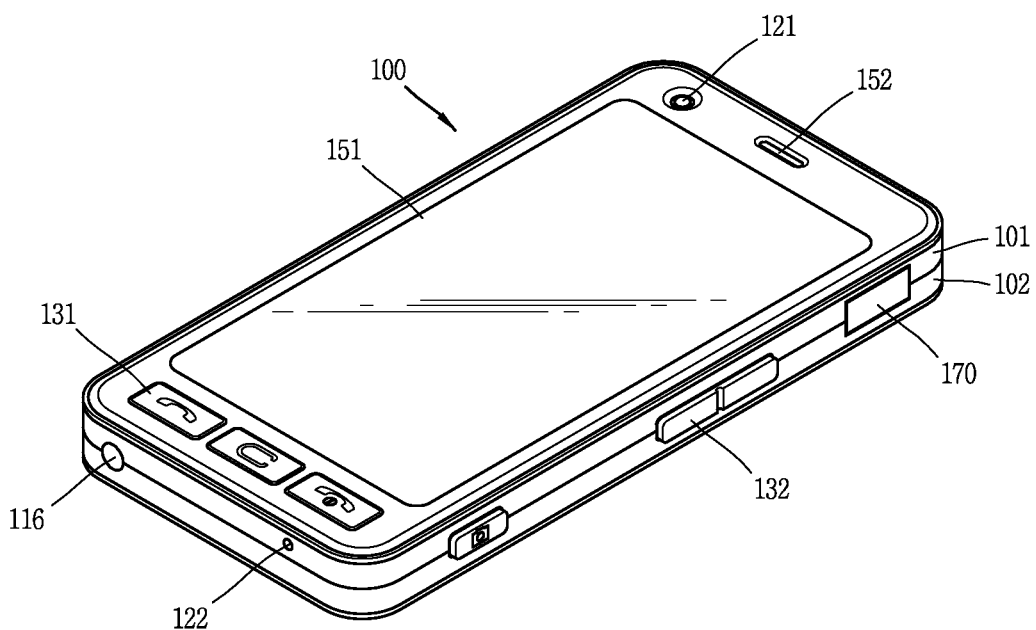
FIGS. 2A and 2B are perspective views illustrating one example of the mobile terminal according to one embodiment of the present invention when viewed from the front side and the rear side, respectively.
Figure 2B:
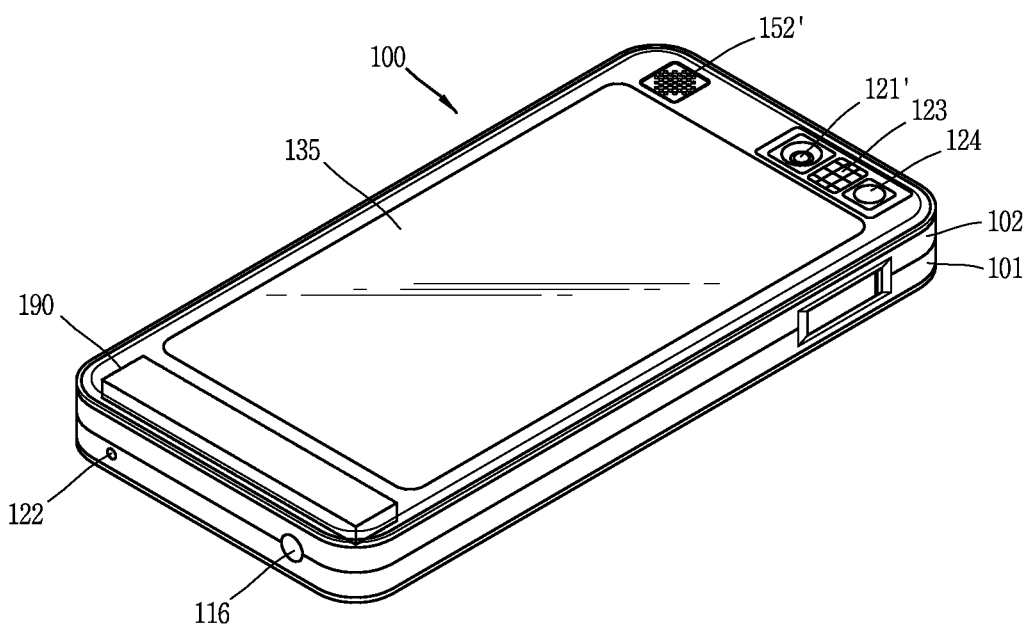

FIG. 2A is a front perspective view of the mobile terminal according to an embodiment of the present invention, and FIG. 2B is a rear perspective view of the mobile terminal according to an embodiment of the present invention The mobile terminal 100 according to the present invention is a bar type mobile terminal. However, the present invention is not limited to this, but may be applied to a slide type in which two or more bodies are coupled to each other so as to perform a relative motion, a folder type, or a swing type, a swivel type and the like. A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti). At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this case, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from the camera 121. For example, the camera 121 may operate with relatively lower pixels (lower resolution). Thus, the camera 121 may be useful when a user can capture his face and send it to another party during a video call or the like.

Further, the camera 121' may operate with relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' may cooperate with the audio output unit 252 so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151. A retractable broadcast antenna 116 may also be included.

In the mobile terminal according to one embodiment of the present invention, at least one item of information among items of information (or items of video information) that are output on the display unit is extracted based on a user request. Furthermore, the extracted information is output back on the display unit. In addition, in the mobile terminal according to one embodiment of the present invention, different extraction ways can be provided depending on a property of the information that is output, in extracting the information that is output on the display unit.

In addition, throughout the present specification, the phrase "extract information" is construed to mean "copy information," and the phrase "output the extracted information back" is construed to mean "paste the extracted information.

A way in which the information that is output on the display unit is extracted and utilized is described in more detail below referring to the accompanying drawings. In particular, FIG. 3 is a flowchart and FIGS. 4A-4D are diagrams illustrating a method of extracting the information in the mobile terminal according to one embodiment of the present invention.

As shown, the mobile terminal outputs the video information on the display unit 151 (S310). The video information includes various types of information, and for example, includes at least one of text, image, and a moving image. The video information includes various types of information that can be output on the mobile terminal, such as an application execution screen, a home screen page, a web browser screen, a call screen, an address book screen, a message screen, a memo screen, and so on.

When at least one region of the display unit 151 is selected when the video information is output on the display unit 151, in response to this, the method includes selecting a graphic object for extracting information included in the selected one region proceeds (S320). Further, the one region is selected or is set based on a touch applied to the display unit 151. As one example, the controller 180 selects the one region, based on the extent to which a pinch-in touch or a pinch-out touch is applied to at least two points on the display unit 151. Further, a size of the one region varies depending on the extent of the pinch-in touch or the pinch-out touch.

In addition, the one region is automatically selected or set based on a predetermined-type touch (for example, a long touch, a double touch, and so on) with respect to one point on the display unit. That is, the controller 180 sets a region on which information, associated with the information displayed on one point to which the predetermined-type touch is applied, is displayed, as one region that is to be selected based on the predetermined-type touch with respect to the one point.

There are various methods of selecting one region. In addition, when one region is selected as described above, the controller 180 outputs the graphic object for extracting or copying the information included in the selected one region, that is, content or multimedia content included in the one region. Further, the graphic object is utilized when the user extracts or copies the information included in the one region, that is, the content. When the graphic object is selected, the controller 180 copies at least one item of information among the items of information included in the one region or at least one items of content among the items of content, which are included in the one region.

Figure 4A:
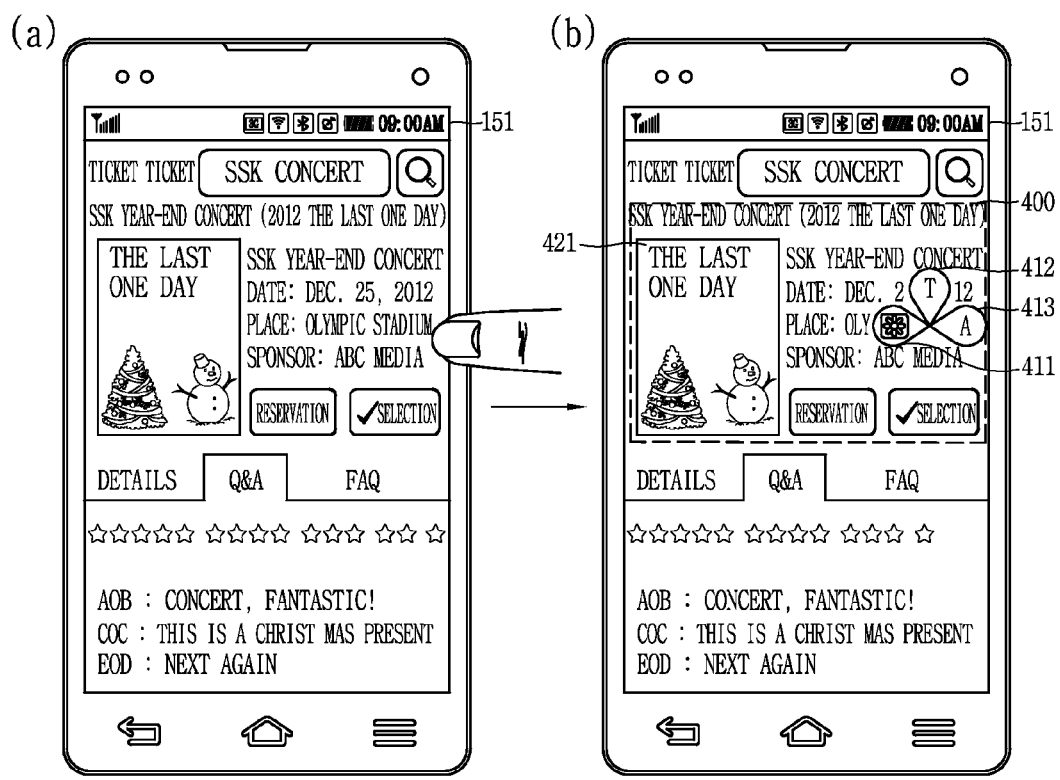
FIGS. 4A(a) and 4A(b), FIGS. 4B(a) and 4B(b), FIGS. 4C(a) and 4C(b), and FIGS. 4D(a) and 4D(b) are diagrams illustrating the method in which the information is extracted in the mobile terminal according to one embodiment of the present invention.

The controller 180 outputs the graphic object that has the video information that differs depending on the property of the information included in the one region. For example, when one region 400 is selected as illustrated in FIG. 4A(b) based on the predetermined-type touch with respect to the display unit 151 as illustrated in FIG. 4A(a), the controller 180 outputs at least one graphic object 411, 412, or 413 depending on a type of information included in the selected one region 400.

That is, when the one region 400 is selected, the controller 180 analyzes the type of information included in the selected one region 400 and outputs a graphic object corresponding to the analyzed type. For example, when the property of the information included in the selected one region corresponds to an image 421, the controller 180 outputs a first graphic object 411 for extracting information corresponding to the image.

Then, if the property of the information included in the selected one region corresponds to, for example, text "SI-KYONG SUNG, year-end live concert (2012, the last one day), SI-KYONG SUNG, year-end live concert, date: Dec. 25, 2012, . . . ," the controller 180 outputs a second graphic object 412 for extracting the information corresponding to the text. Then, the controller 180 outputs a third graphic object 413 for extracting the information itself corresponding to the selected one region in an image format.

Further, in the mobile terminal according to one embodiment of the present invention, at least one graphic object for extracting the information, output on the display unit 151, in the format that differs depending on the property of the information can be output. If the items of information included in the one region 400 can be extracted as having at least two properties (for example, image and text), the controller 180 outputs the graphic objects corresponding to at least the two properties, respectively.

Then, although only the region corresponding to the information that the user intends to select is not selected, he/she can select the graphic object corresponding to the property of the item of information that he/she intends to extract from the items of information included in the region, Thus, the desired information can be selected and extracted.

In addition, based on the selection of at least one of the graphic objects that are output after outputting the graphic object, the method extracts the item of information corresponding to the property corresponding to the graphic object selected among the items of information included in the selected one region proceeds (S330).

That is, the controller 180 extracts at least one item of information among the items of information included in the one region 400, using the property corresponding to the graphic object selected by the user from the graphic objects that correspond to different properties, respectively.

Figure 4B:
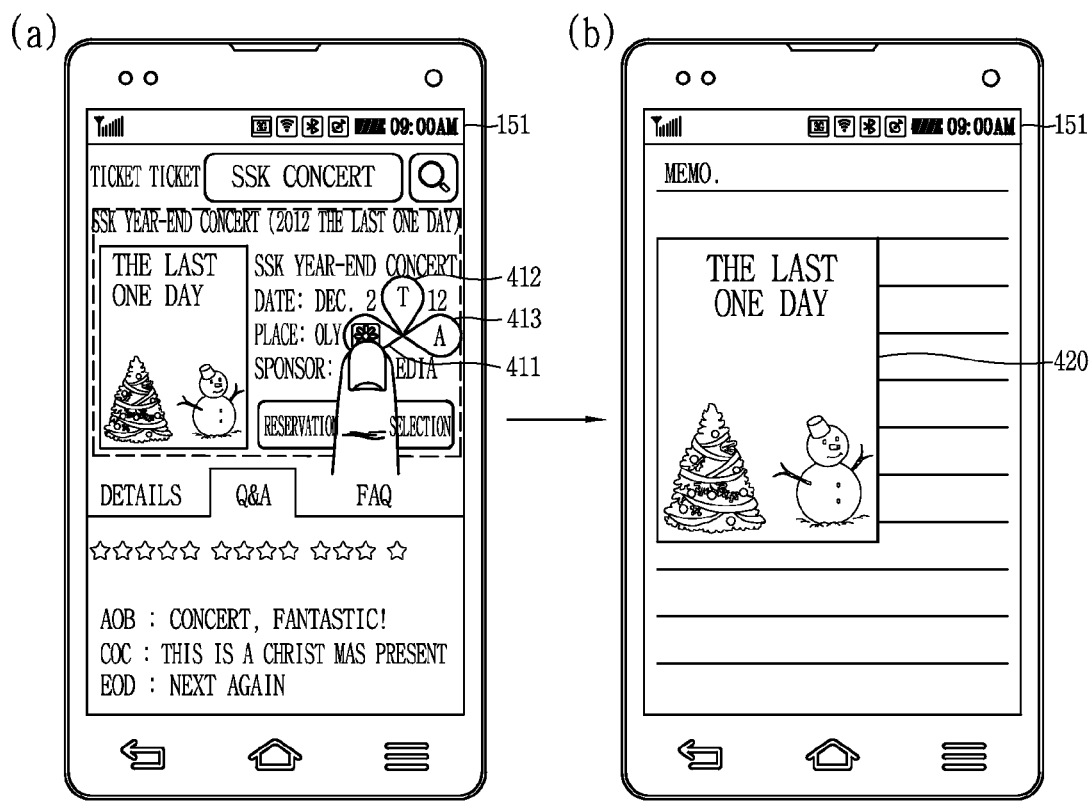

For example, if the first graphic object 411 for extracting the information corresponding to an image property from the items of information included in the one region 400 is selected when the items of information corresponding to the image and the text, respectively, are output on the one region 400, as illustrated in FIG. 4B(a), the controller 180 selectively extracts only the information corresponding to the image except for the information corresponding to the text from the items of information included in the one region 400.

Based on the selection by the user of a paste function as illustrated in FIG. 4B(b), the information extracted is input into and output on an arbitrary input region. For example, the extracted image 420 is input into and output on a memo pad corresponding to a memo-function application.

Figure 4C:
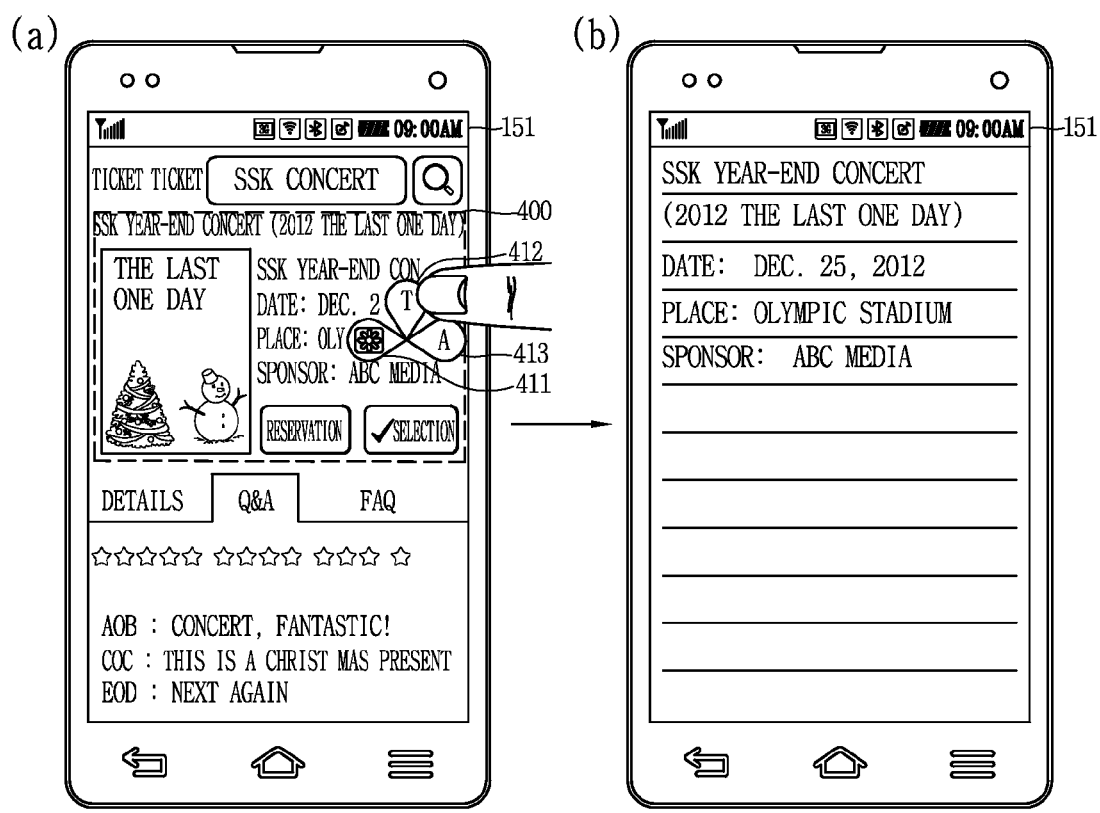

In addition, if the second graphic object 412 for extracting the information corresponding to a text property from the items of information included in the one region 400 is selected when the items of information corresponding to the image and the text, respectively, are output on the one region 400, as illustrated in FIG. 4C(a), the controller 180 selectively extracts only the information corresponding to the text except for the information corresponding to the image from the items of information included in the one region 400.

Based on the selection by the user of the paste function as illustrated in FIG. 4C(b), the information extracted is input into and output on an arbitrary input region. For example, the extracted information is input into and output on the memo pad corresponding to the memo-function application.

Figure 4D:
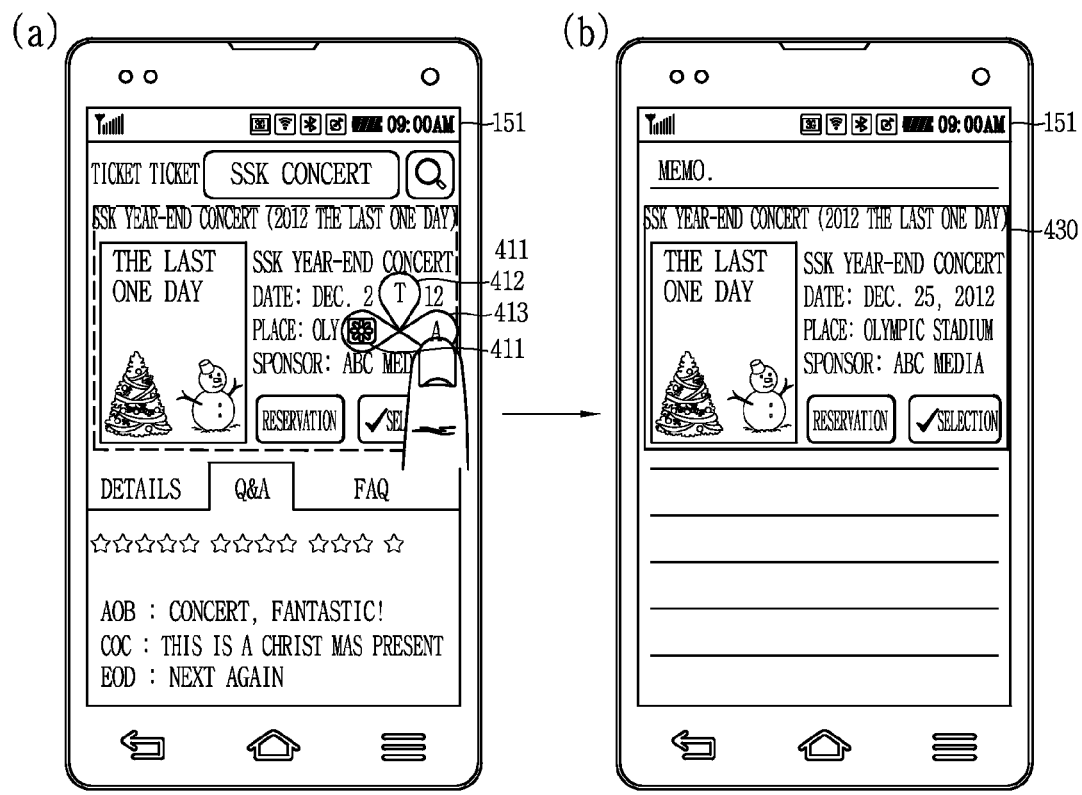

In addition, for example, if the third graphic object 413 for extracting the information included in the one region 400 such as is output on the display unit 150 is selected when the items of information corresponding to the image and the text, respectively, are output on the one region 400, as illustrated in FIG. 4D(a), the controller 180 extracts the information included in the one region 400, as is, in the image format. In addition, the information extracted is stored in the memory 160 and can be separately viewed in a photo album.

Based on the selection by the user of the paste function as illustrated in FIG. 4D(b), the information extracted is input into and output on an arbitrary input region, in the image format 430. For example, the extracted information is input into and output on the memo pad corresponding to the memo-function application.

As described above, in the mobile terminal according to one embodiment of the present invention, if the items of information that corresponds to different properties (for example, the image, the text, and the moving image), respective, are included in one region that is selected based on the user selection, it is possible to output the graphic object that enables only the information corresponding to the property desired by the user to be selectively extracted from items of information that correspond to the different properties, respectively. That is, in the mobile terminal according to one embodiment of the present invention, user convenience can be provided in extracting the information.

The method is described above in which if the items of information that correspond to the multiple properties are included in the selected one region, only the information corresponding to any one of the properties is selectively extracted through the graphic object. A method in which if the items of information included in one region can be extracted as having the multiple properties, it is selected which of the multiple properties the information included in the one region correspond to for extraction is described in more detail below referring to the accompanying drawings.

Next, FIGS. 5-7 are diagrams illustrating a method in which the information is extracted depending on the property of the information in the mobile terminal according to one embodiment of the present invention.

As described above, if the items of video information are output on the display unit 151 of the mobile terminal according to one embodiment of the present invention and one item of video information is selected, the controller 180 outputs the graphic object for at least one item of video information. Further, the graphic object has the video information or an exterior appearance that differs depending on the property of the information corresponding to at least one item of video information.

Figure 6B:
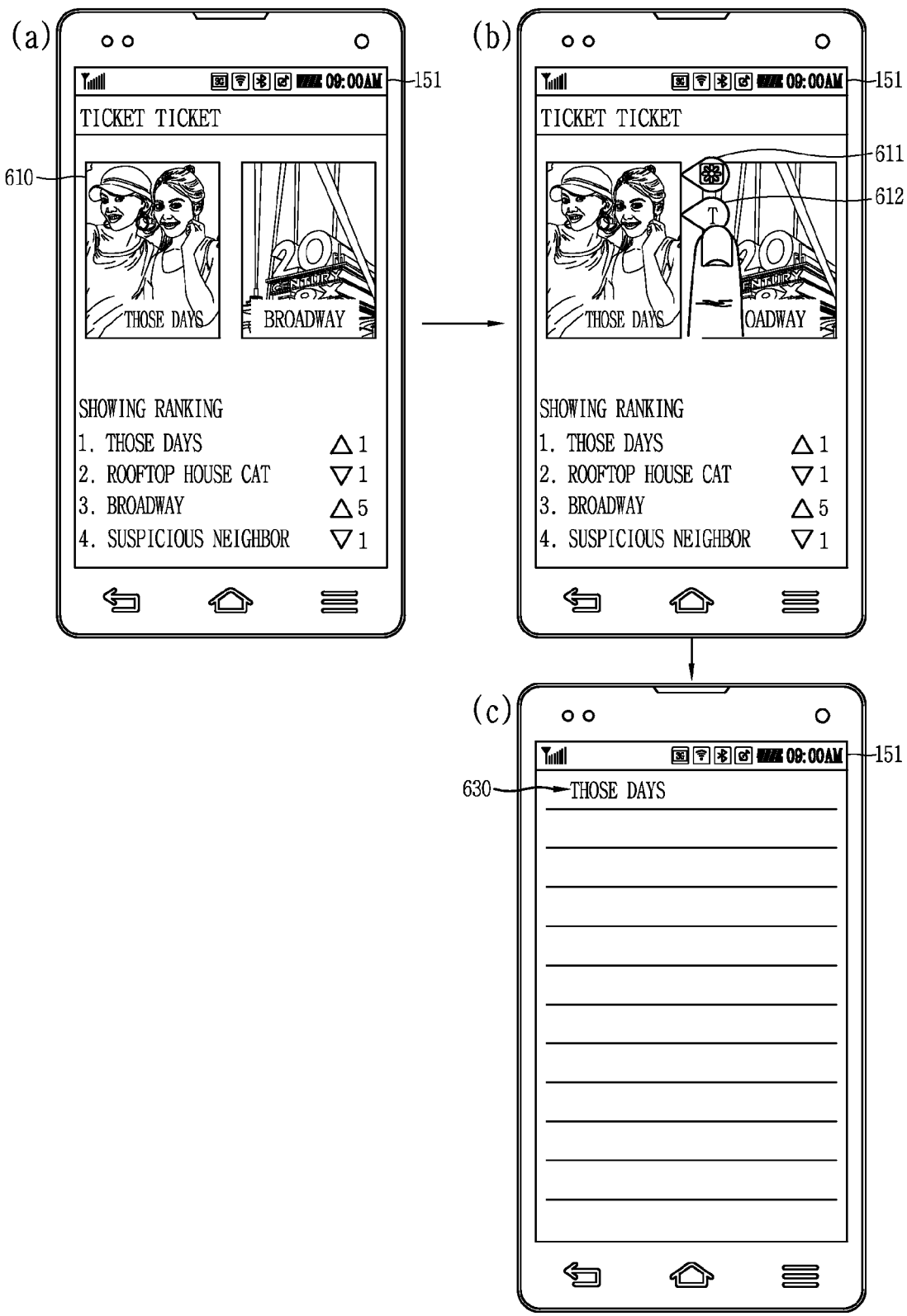
FIGS. 6A(a) to 6A(c) and FIGS. 6B(a) to 6B(c) are diagrams illustrating the method in which the information is extracted depending on the property of the information in the mobile terminal according to one embodiment of the present invention.
Figure 7A:
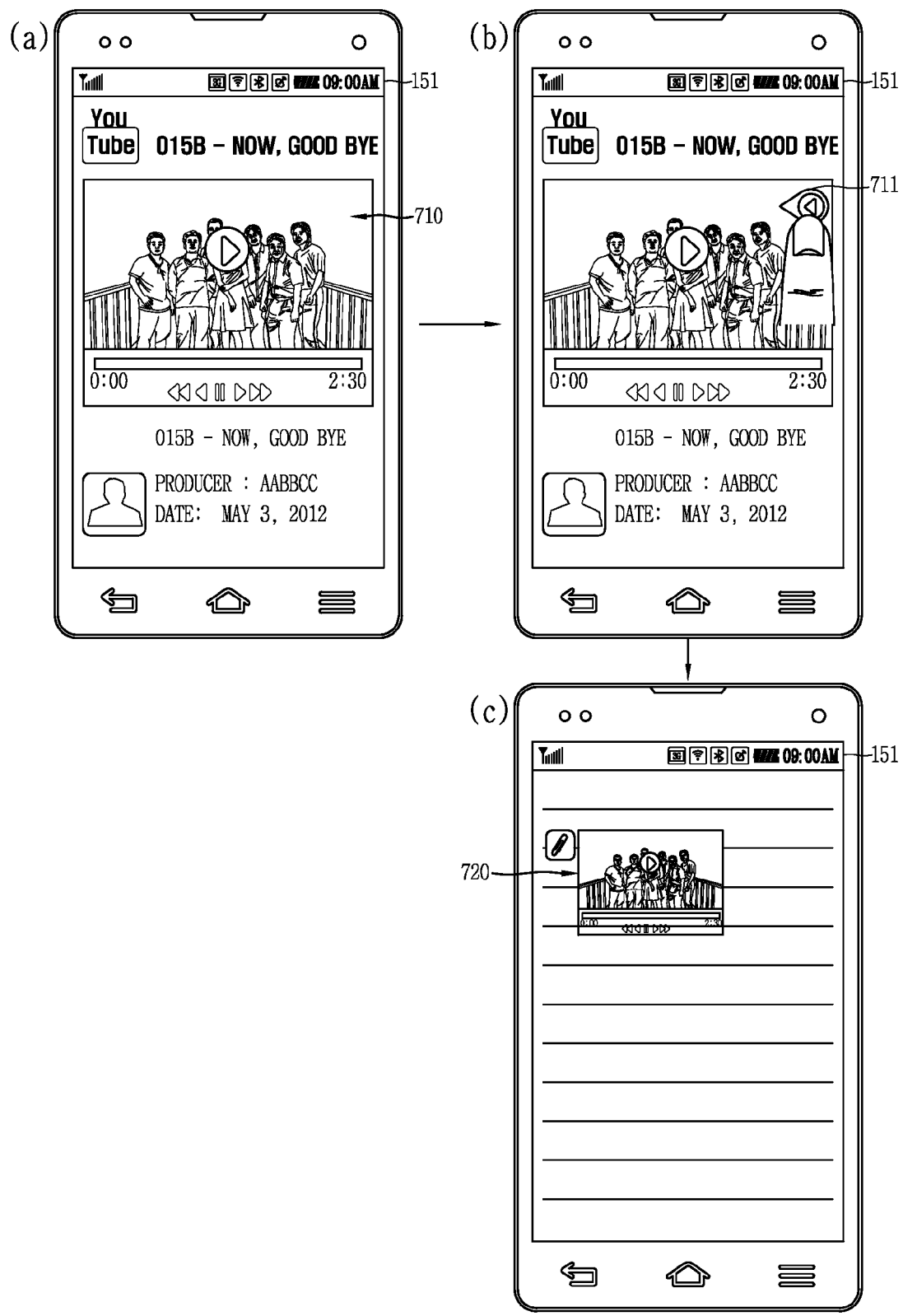
FIGS. 7A(a) to 7A(c) and FIGS. 7B(a) to 7B(c) are diagrams illustrating the method in which the information is extracted depending on the property of the information in the mobile terminal according to one embodiment of the present invention.

For example, the video exterior appearance of the graphic object varies depending on whether the property of the information corresponding to at least one item of video information is the text, the image, or the moving image (refer to Identification No. 511 in FIG. 5A(b), Identification No. 611 in FIG. 6A(b), and Identification No. 711 in FIG. 7A(b)).

In addition, if one region 510 including the information corresponding to the text property is selected as illustrated in FIG. 5A(a), the controller 180 outputs a graphic object 511 for extracting the information included in the selected one region 510 as illustrated in FIG. 5A(b). Then, if the graphic object 511 is selected, the controller 180 extracts the information included in the one region 510, that is, "what's an interface," in a text format. The information extracted is output back on the display unit 151 depending on the user selection as illustrated in FIG. 5A(c).

Figure 5B:
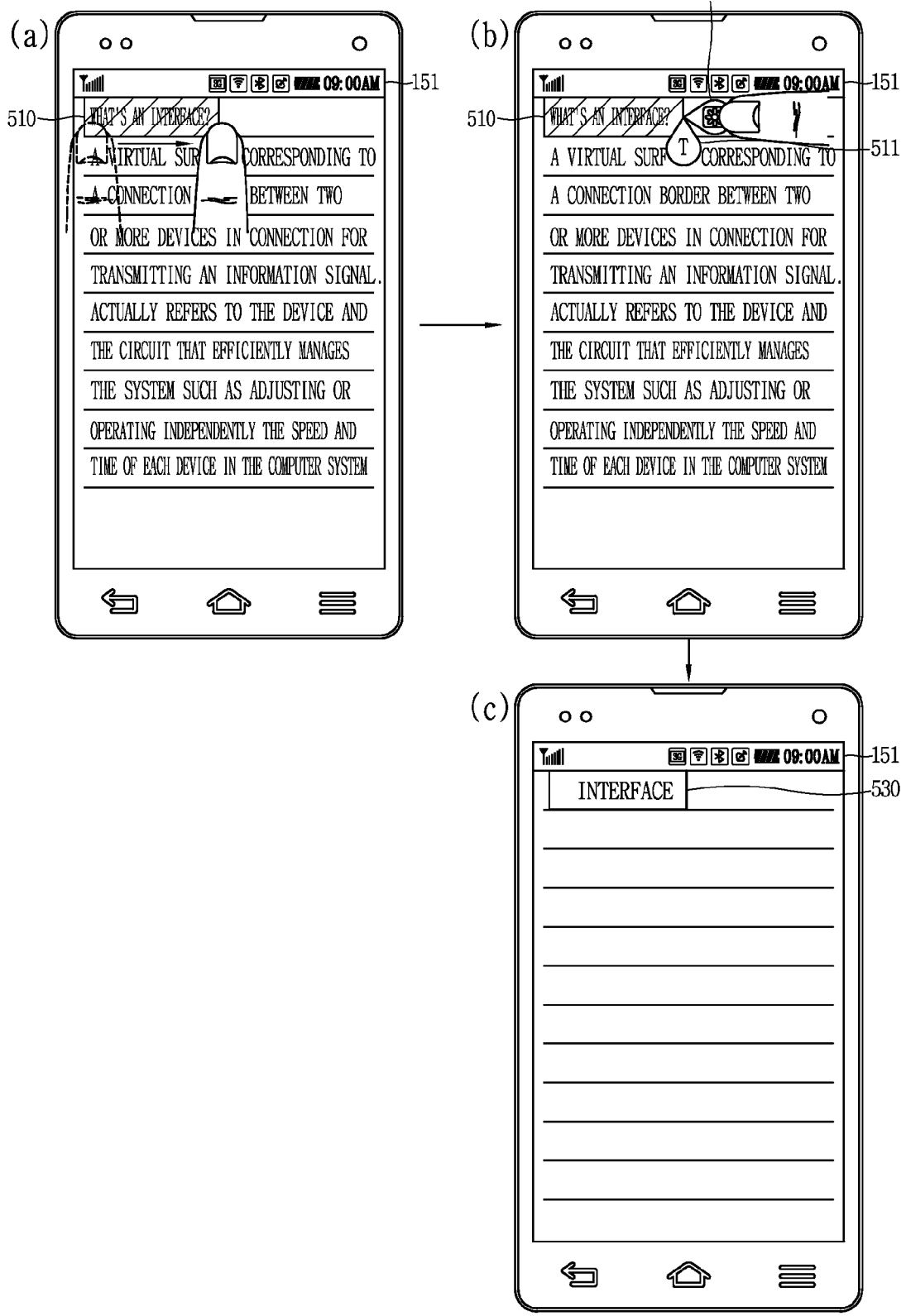
FIGS. 5A(a) to 5A(c) and FIGS. 5B(a) to 5B(c) are diagrams illustrating the method in which the information is extracted depending on the property of the information in the mobile terminal according to one embodiment of the present invention.

In addition, if the information included in the one region 510 is extracted as having the text property other than the text property as illustrated in FIG. 5B(a), the controller 180 outputs together a graphic object 512 for extracting the information included in the one region 510 as the information corresponding to the image property. Then, if the graphic object 512 is selected, the controller 180 extracts the one region 510 as an image 530 and outputs the image 530 on the display unit 151 depending on the user selection as illustrated in FIG. 5B(c).

In addition, if one region 610 including the information corresponding to the image property is selected as illustrated in FIG. 6A(a), the controller 180 outputs a graphic object 611 for extracting the information included in the selected one region 610 as illustrated in FIG. 6A(b). Then, if the graphic object 611 is selected, the controller 180 extracts the information corresponding to the one region 610 in the format of the image that is the property corresponding to the information included in the one region 610. Then, the extracted information is output back on the display unit 151 depending on the user selection as illustrated in FIG. 6A(c) (refer to 620).

In addition, if the information (for example, "those days") corresponding to the text property is included in the image that is information included in the one region 610 as illustrated in FIG. 6A(a), that is, if the information included in the one region 610 can be extracted as having the text property other than the image property, the controller 180 outputs together a graphic object 612 for extracting the information included in the one region 610 as the information corresponding to the text property as illustrated in FIG. 6B(b).

Then, if the graphic object 612 is selected, the controller 180 extracts information 630 corresponding to the text from the items of information included in the one region 610 and outputs the extracted information 630 on the display unit 151 depending on the user selection as illustrated in FIG. 6B(c).

In addition, if one region 710 including the information corresponding to a moving image property is selected as illustrated in FIG. 7A(a), the controller 180 outputs a graphic object 711 for extracting the information included in the selected one region 710 as illustrated in FIG. 7A(b). Then, if the graphic object 711 is selected, the controller 180 extracts the information corresponding to the one region 710 in the format of the moving image that is the property corresponding to the information included in the one region 710. Then, the extracted information is output back on the display unit 151 depending on the user selection as illustrated in FIG. 7A(c) (refer to 720).

In addition, if the moving image that is the information included in the one region 710 can be extracted as the different information format other than the moving image as illustrated in FIG. 7B(a), for example, if a URL address corresponding to the moving image can be extracted or the information that is output on the display unit 151 as is can be extracted in the image format, the controller 180 outputs graphic objects 711, 712, and 713 for extracting the items of information included in the one region 710 as the items of information corresponding to the moving image, URL address, and the image formats, respectively, as illustrated in FIG. 7B(b).

Then, if any one of the multiple graphic objects 711, 712, and 713 is selected, the controller 180 extracts the information included in the one region 710 in the format corresponding to the selected graphic object. For example, if the graphic object 713 for extracting the URL address is selected as illustrated in FIG. 7B(b), the controller 180 extracts the URL address corresponding to the moving image included in the one region 710. Then, as illustrated in FIG. 7B(c), the controller 180 outputs the extracted information on the display unit 151 depending on the user selection.

As described above, in the mobile terminal according to one embodiment of the present invention, if the items of information included in the one region are extracted as having the multiple properties, the multiple graphic objects for helping extract the items of information included on the one region as corresponding to the multiple properties, respectively, are output. Therefore, the user can extract the desired information conveniently by selecting any one of the multiple graphic objects.

Figure 8:
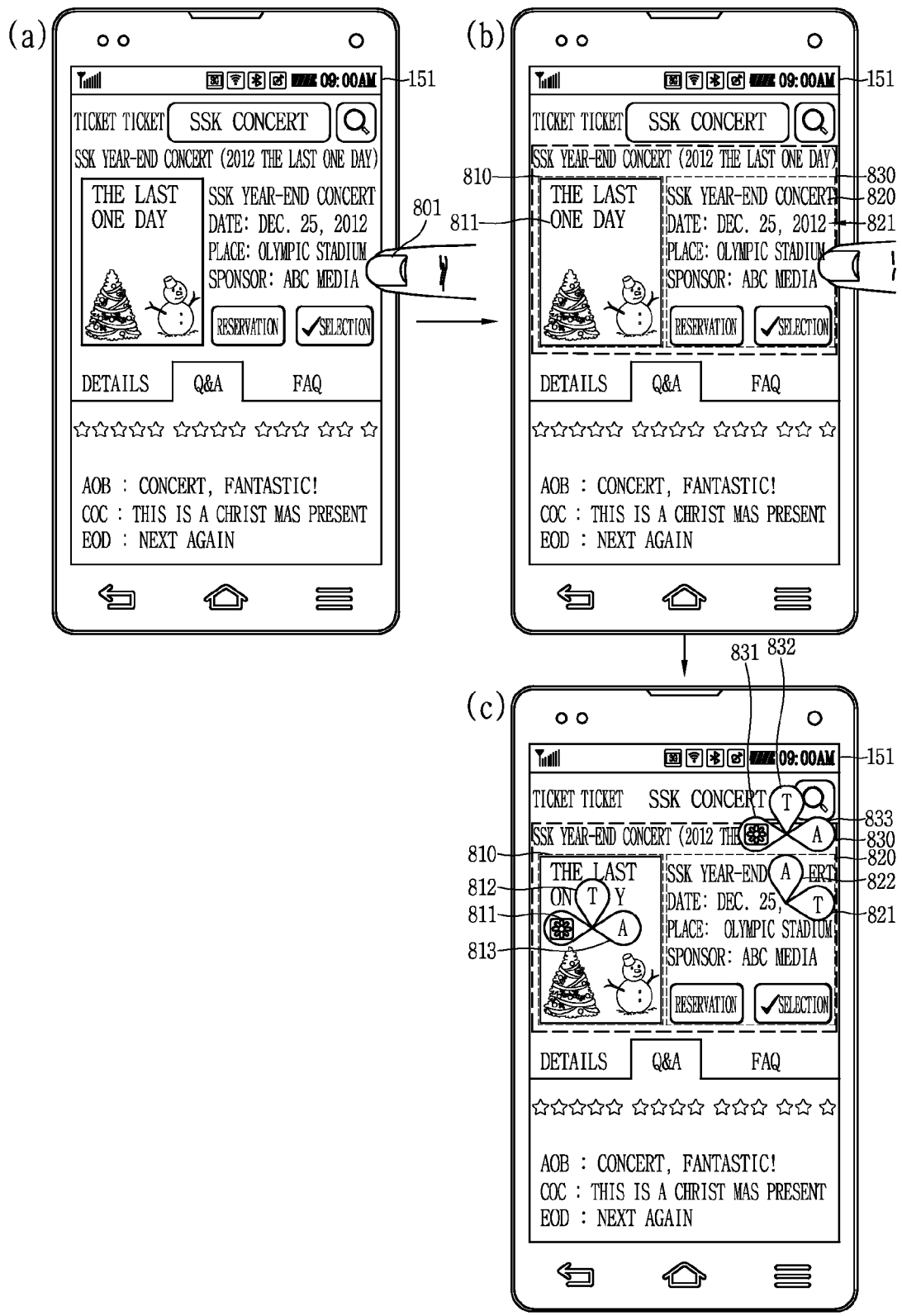
FIGS. 8A to 8C are diagrams illustrating a method in which a region is set in the mobile terminal according to one embodiment of the present invention.

A method in which one region including the information to be extracted is selected is described in more detail below referring to the accompanying drawings. FIGS. 8 and 9 are diagrams illustrating the method in which the region is set in the mobile terminal according to one embodiment of the present invention.

As described above, one target region for information extraction is selected or set based on the touch applied to the display unit 151. As one example, as illustrated in FIG. 8(a), the controller 180 automatically selects or sets based on a predetermined-type touch (for example, a long touch, a double touch, and the like) with respect to one point 801 on the display unit 151. That is, the controller 180 sets a region, on which information associated with information displayed on one point to which the predetermined-type touch is applied is displayed, to one region 830 that is selected based on the predetermined-type touch with respect to the one point.

In addition, the controller 180 divides the one region 830 into multiple regions 810 and 820, depending on a type of information included in the one region 830. For example, as illustrated in FIG. 8(b), the controller 180 divides the one region 830 into the multiple regions, depending on the property of the information included in the one region 830. The controller 180 defines a region on which an image 811 is displayed as a first region 810, a region on which text 821 is displayed as a second region 820, and a region including both of the image 811 and the text 821 as a third region 830.

Then, as illustrated in FIG. 8(c), the controller 180 outputs at least one graphic object 811, 812, 813, 821, 822, 831, 832, or 833 for extracting information included in any one of the first, second, and third regions 810, 820, and 830 depending on the property of the information, on each region. Therefore, the user can extract the desired information by selecting the graphic object included in the region from which the information is intended to be extracted.

Figure 9A:
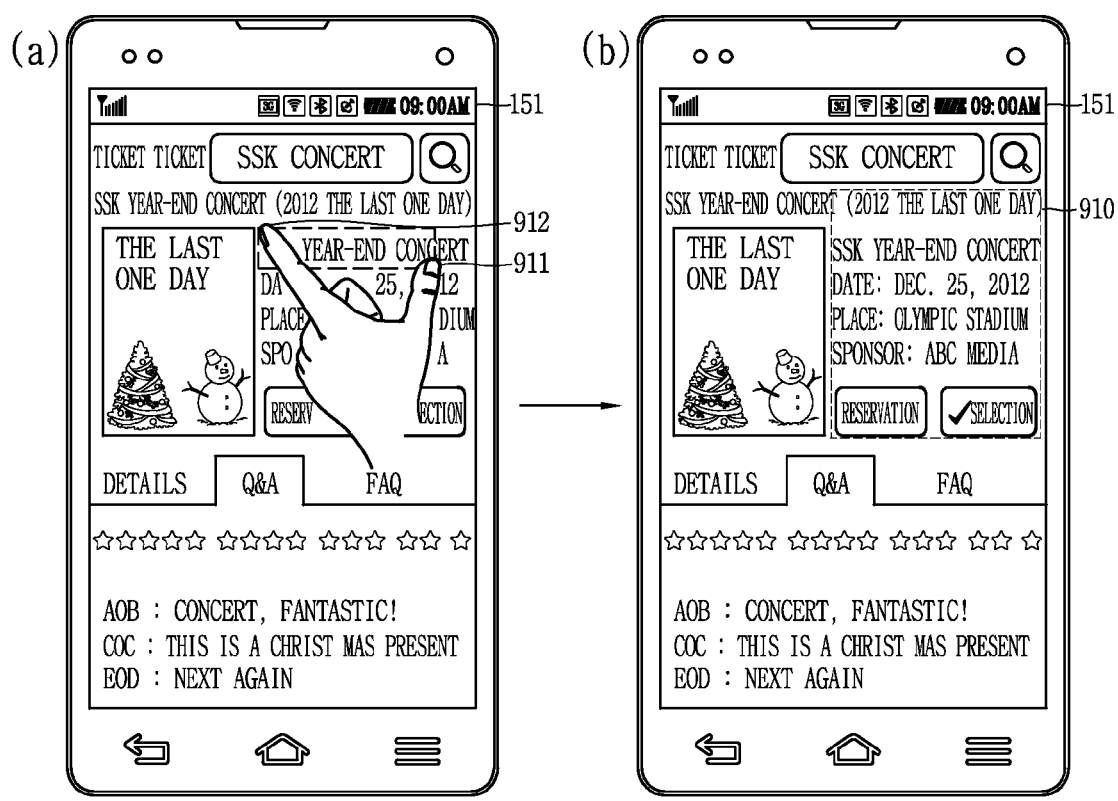
FIGS. 9A(a) and 9A(b) and FIGS. 9B(a) to 9B(c) are diagrams illustrating a method in which a region is set in the mobile terminal according to one embodiment of the present invention.

As another example, the display unit 151 selects one region 910 as illustrated in FIG. 9A(b), based on the extent of the pinch-in touch or the pinch-out touch with respect to at least two points on the display unit 151, or the extent of the drag touch starting with the touch-on of any point as illustrated in FIG. 9A(a). At this time, a size of the one region varies depending on the extent of the pinch-in touch, the pinch-out touch, or the drag touch.

Figure 9B:
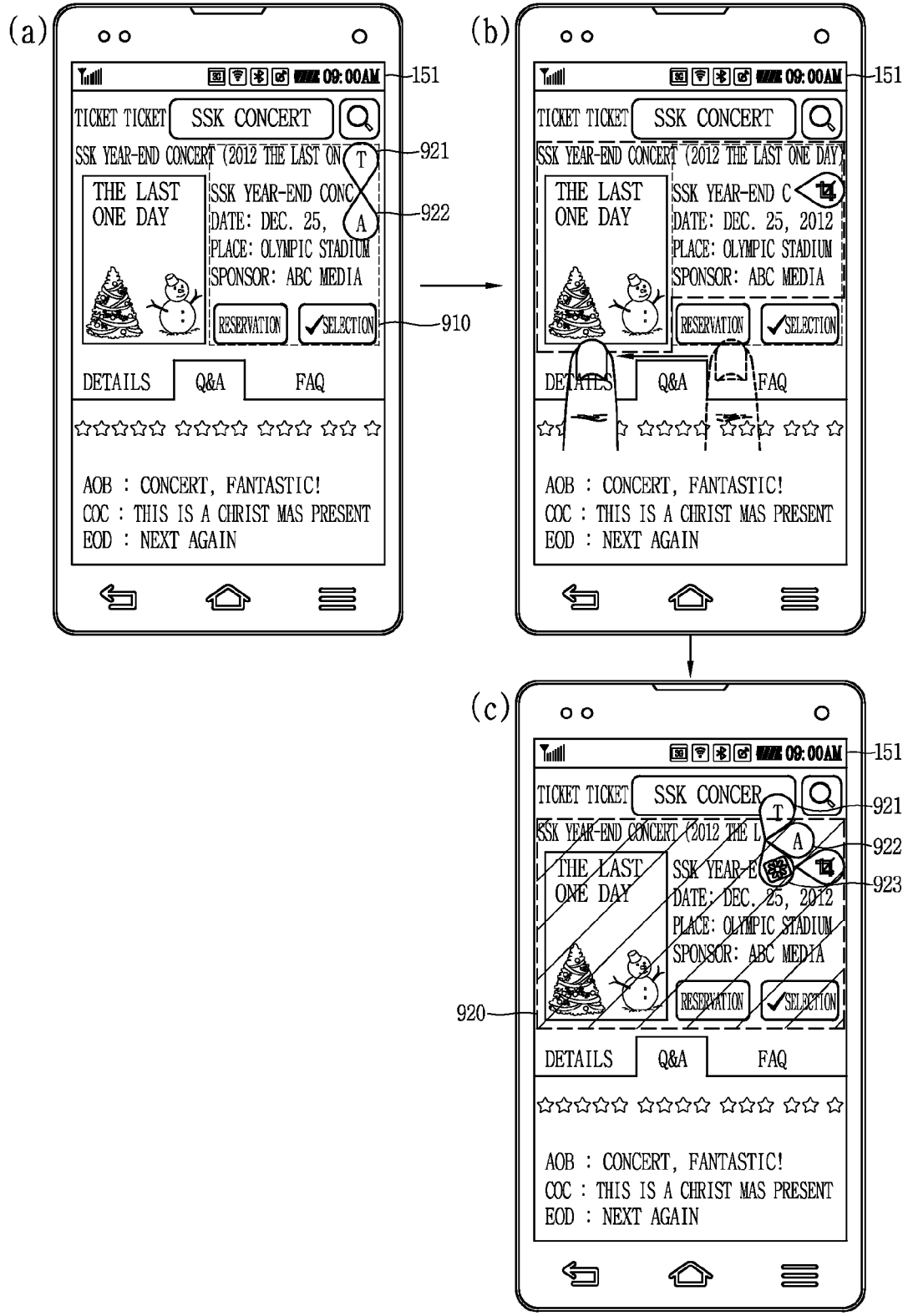

When the one region 910 is selected, the controller 180 outputs graphic objects 921 and 922 for extracting information included in the one region 910, depending on the property of the information (for example, when the information having the text property is included) included in the selected one region 910, as illustrated in FIG. 9B(a).

In addition, the controller 180 changes a selected one region 920, based on the touch with respect to the one region 910, as illustrated in FIGS. 9B(b) and 9B(c). Then, if the property of the information included in the changed one region 920 is different from the property of the information that is included in the one region 910 before changing the selected one region 920, the controller 180 additionally outputs a graphic object 923 for extracting information included in the changed one region 920.

Therefore, when the graphic object corresponding to the property of the information that is included in the one region 910 before changing the selected one region 920 is selected, the information that is included in the one region 910 before changing the selected one region 920 is extracted, and when the graphic object corresponding to the property of the information included in the changed one region 920 is selected, the information included in the changed one region 920 is extracted.

Figure 10A:
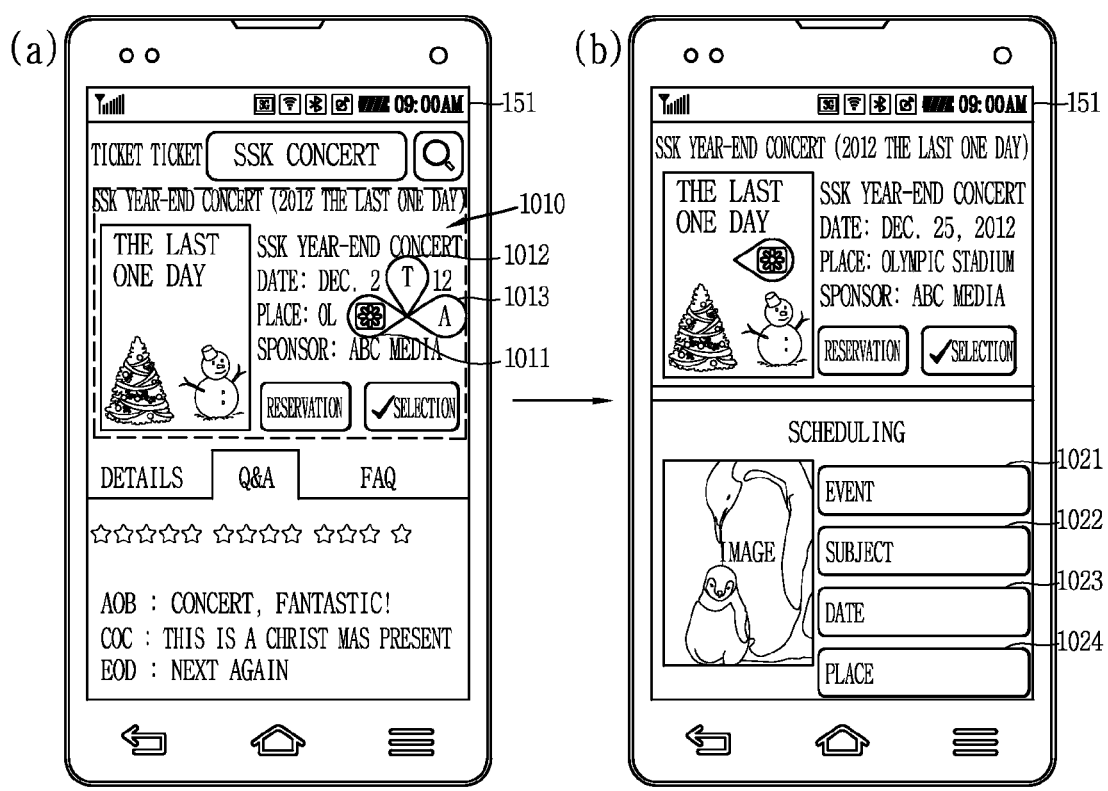
FIGS. 10A(a) and 10A(b) and FIGS. 10B(a) and 10B(b) are diagrams illustrating an information input window corresponding to the information extracted in the mobile terminal according to one embodiment of the present invention.

A method in which a region into which the information included in the selected one region is input is output corresponding to the selection of one region for information extraction is described in more detail below referring to the accompanying drawings. FIGS. 10A(a) and 10A(b) and FIGS. 10B(a) and 10B(b) are diagrams illustrating an information input window corresponding to the information extracted in the mobile terminal according to one embodiment of the present invention.

In the mobile terminal according to one embodiment of the present invention, corresponds to the selection of one region 1010 as illustrated in FIG. 10A(a), the controller 180 outputs at least one input window 1021, 1022, 1023, or 1024 into which the information included in the selected one region 1010 is input, as illustrated in FIG. 10A(b). The controller 180 analyzes the contents corresponding to the information included in the selected one region 1010 and outputs the input window associated with the analyzed contents. The controller 180 executes an application into which the analyzed contents are intended to be input and outputs an execution screen of the application at least on at least one part of the display unit 151.

In addition, the controller 180 determines the number of windows according to the property of the information included in the one region 1010. For example, if the property of information included in the one region 1010 corresponds to two properties, that is, the image and the text, the controller 180 outputs at least two input windows.

Figure 10B:
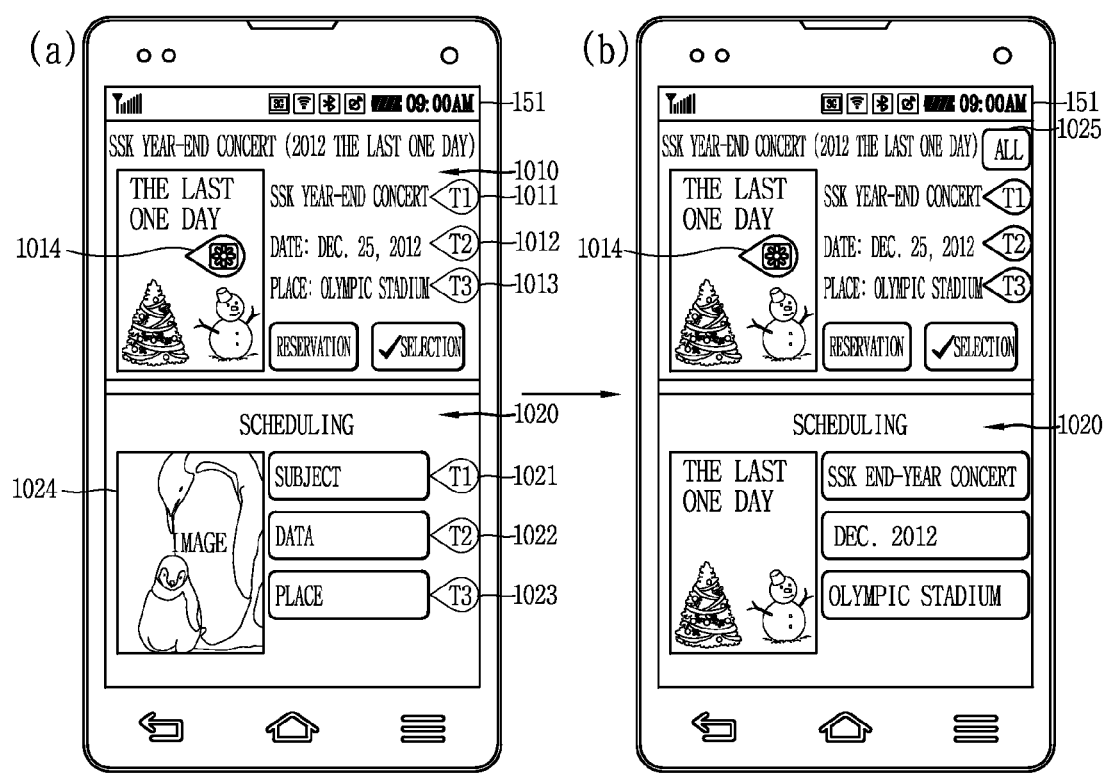

In addition, as illustrated in FIG. 10B(a), the controller 180 provides the user with the information as to which input window the information to be extracted is input into by outputting the graphic object 1021, 1022, 1023, or 1024 on at least one of the input windows into which the information included in the one region 1010 is input, and by outputting the graphic object 1011, 1012, 1013, or 1024 on the one region 1010.

As illustrated, the graphic object is output adjacent to any one of the information or the content included in the input window and the selected one region or is output on both of the input window and the content.

In addition, when the graphic object that is output on the input window or on the one region 1010 is selected, the controller 180 outputs one item of information corresponding to the selected graphic object among items of extracted information, on the input window corresponding to the selected graphic object.

Furthermore, the controller 180 outputs an all-outputting icon 1025 as illustrated in FIG. 10B(b). If the all-outputting icon 1025 is selected, the controller 180 outputs all the items of information included in one region 1010 on the input windows, respectively. As described above, in the mobile terminal according to one embodiment of the present invention, the input window into which the extracted information is provided and this can save the user the trouble of separately executing an application to input the extracted information.

In addition, in the mobile terminal according to one embodiment of the present invention and a method of controlling the mobile terminal, the information output on the display unit is extracted based on the property of the information, and the input window into which the extracted information is directly input is output. In this instance, the input window differs depending on the property of the extracted information. Therefore, the user is provided with the suitable input window that depends on the property of the extracted information and thus can utilize he extracted information more conveniently.

In addition, in the mobile terminal according to one embodiment of the present invention and in the method of controlling the mobile terminal, if the items of information that are output on the display unit can be extracted as having the multiple properties, the items of information that correspond to the multiple properties, respectively, are provided. Therefore, the user can intuitively select and extract the information corresponding to the necessary property.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen display unit configured to display content; and
a controller configured to:
receive a setting of a region included in the displayed content,
analyze a type of information included in the set region, wherein the type of the information includes at least one of text, a URL, an image, and a moving image,
divide the set region into multiple regions depending on the type of the information included in the set region,
display at least one graphic object for extracting information included in any one of the multiple regions depending on the type of the information, on each of the multiple region,
wherein a first graphic object corresponding to a first type of information included in the first region among the multiple regions is displayed on the first region, and a second graphic object corresponding to a second type of information included in the second region among the multiple regions is displayed on the second region,
receive a selection of one of the first graphic object and the second graphic object,
extract the first type of information included in the first region if the first graphic object is selected and extract the second type of the information included in the second region if the second object is selected, and
display extracted information among the first type of the information and the second type of the information based on the user's request.

2. The mobile terminal of claim 1, wherein the first and second graphic objects are displayed based on a selection of the set region and as having a propeller shape.

3. The mobile terminal of claim 1, wherein the controller is further configured to:
   execute a memo or messaging application, and
   display the extracted information in a separate memo or messaging window different than a window displaying the content.

4. The mobile terminal of claim 1, wherein the set region included in the displayed content is set through a predetermined touch input with respect to the touch screen display unit.

5. The mobile terminal of claim 1, wherein the controller is further configured to:
   change the set region into a new region based on a touch with respect to the set region,
   display the first graphic object if the new region includes the first type of the information,
   display the second graphic object if the new region includes the second type of the information, and
   display a third graphic object if the new region includes a third type of the information.

6. The mobile terminal of claim 1, wherein the controller is further configured to:
   display a first input window associated with the first type of the information, and
   display a second input window associated with the second type of the information.

7. The mobile terminal of claim 6, wherein the controller is further configured to populate the first and second input windows with the first and second type of information based on a selection of the set region.

8. A method of controlling a mobile terminal, the method comprising:
   displaying, via a touch screen display unit of the mobile terminal, content;
   receiving, via a controller of the mobile terminal, a setting of a region included in the displayed content;
   analyzing a type of information included in the set region, wherein the type of the information includes at least one of text, a URL, an image, and a moving image;
   dividing the set region into multiple regions depending on the type of the information included in the set region, display at least one graphic object for extracting information included in any one of the multiple regions depending on the type of the information, on each of the multiple region,
   wherein a first graphic object corresponding to a first type of information included in the first region among the multiple regions is displayed on the first region, and a second graphic object corresponding to a second type of information included in the second region among the multiple regions is displayed on the second region;
   receiving a selection of one of the first graphic object and the second graphic object;
   extracting the first type of the information included in the first region if the first graphic object is selected and extract the second type of the information included the second region if the second object is selected; and
   displaying extracted information among the first type of the information and the second type of the information based on the user's request.

9. The method of claim 8, wherein the first and second graphic objects are displayed based on a selection of the set region and as having a propeller shape.

10. The method of claim 8, further comprising:
    executing a memo or messaging application; and
    displaying the extracted information in a separate memo or messaging window different than a window displaying the content.

* * * * *